(12) United States Patent
Gronemeyer (10) Patent No.: US 8,446,223 B2
(45) Date of Patent: May 21, 2013

(54) SYSTEMS AND METHODS FOR CALIBRATING REAL TIME CLOCK

(75) Inventor: Steven A Gronemeyer, Cedar Rapids, IA (US)

(73) Assignee: CSR Technology, Inc., Sunnyvale, CA (US)

( * ) Notice: Subject to any disclaimer, the term of this patent is extended or adjusted under 35 U.S.C. 154(b) by 203 days.

(21) Appl. No.: 12/471,268

(22) Filed: May 22, 2009

(65) Prior Publication Data

US 2010/0295623 A1    Nov. 25, 2010

(51) Int. Cl.
*G01R 23/10* (2006.01)
*G01R 23/02* (2006.01)
*G01S 19/23* (2010.01)

(52) U.S. Cl.
USPC ............ 331/44; 331/176; 368/46; 368/56; 368/118; 342/357.62

(58) Field of Classification Search
USPC .......... 331/44, 1 R, 14, 46, 66, 176; 342/356, 342/357.2, 357.21, 357.22, 357.39, 357.51, 342/357.62; 368/46, 56, 118; 702/89, 106, 702/79, 75, 78; 701/213
See application file for complete search history.

(56) References Cited

U.S. PATENT DOCUMENTS 5,836,691 A * 11/1998 Yamauchi ................... 374/117
7,084,810 B2 * 8/2006 Kitatani .................. 342/357.62
2006/0149984 A1   7/2006 Yasumoto
2006/0195260 A1 * 8/2006 Gronemeyer ............... 701/213
2006/0267703 A1 * 11/2006 Wang et al. ................. 331/176

FOREIGN PATENT DOCUMENTS

EP    1486795    12/2004

OTHER PUBLICATIONS

GB Exam Report for GB Application No. GB1008523.1 dated Mar. 30, 2012.

* cited by examiner

*Primary Examiner* — Ryan Johnson
(74) *Attorney, Agent, or Firm* — Next IP Law Group LLP; Minh N. Nguyen, Esq.

(57) ABSTRACT

Systems and methods for calibrating real time clock are provided. A representative receiver includes a GPS device comprising a real time clock (RTC) circuitry that generates RTC clock signals and a temperature compensated crystal oscillator (TCXO) that generates TCXO clock signals. A ratio counter circuitry receives both the RTC clock signals and the TCXO clock signals and determines a frequency ratio by comparing the RTC clock signals and the TCXO clock signals. A computing device receives the frequency ratio and estimates a current RTC frequency based on the received frequency ratio. The computing device is configured to calibrate an estimated RTC time being maintained at the RTC circuitry based on an estimated RTC frequency from a prior estimation, the current RTC frequency and an elapsed time of the RTC circuitry.

17 Claims, 8 Drawing Sheets

SYSTEMS AND METHODS FOR CALIBRATING REAL TIME CLOCK

TECHNICAL FIELD

The present disclosure is generally related to real time clocks and, more particularly, is related to systems and methods for calibrating real time clock.

BACKGROUND

An operation of GPS navigation systems is to acquire and track GPS satellite signals so that range measurements can be made between several satellites and a receiver in order to compute a location for the receiver. A metric of acquisition performance is time to first fix (TTFF). The TTFF can be dependent on the accuracy of the receiver's a priori estimate of GPS time within its local timing system.

While the receiver is off, the estimate of GPS time is typically maintained with a low power real time clock (RTC) based on a watch-class crystal oscillator. While such oscillators are low power, typically µW level, they are not very accurate. Specifically, the RTC typically suffers temperature dependent errors on the order of 200 PPM over typically specified operating temperature ranges, such as −40° C. to +85° C. Consequently, when the receiver is turned off and the RTC is maintaining time, the accuracy of the RTC time relative to GPS system time rapidly degrades.

SUMMARY

Systems and methods for calibrating real time clock are provided. A representative receiver includes a GPS device comprising a real time clock (RTC) circuitry that generates RTC clock signals and a temperature compensated crystal oscillator (TCXO) that generates TCXO clock signals. A ratio counter circuitry receives both the RTC clock signals and the TCXO clock signals and determines a frequency ratio by comparing the RTC clock signals and the TCXO clock signals. A computing device receives the frequency ratio and estimates a current RTC frequency based on the received frequency ratio. The computing device is configured to calibrate an estimated RTC time being maintained at the RTC circuitry based on an estimated RTC frequency from a prior estimation, the current RTC frequency and an elapsed time of the RTC circuitry.

Other systems, devices, methods, features of the invention will be or will become apparent to one skilled in the art upon examination of the following figures and detailed description. It is intended that all such systems, devices, methods, features be included within the scope of the invention, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, the reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which the real time clock (RTC) can be calibrated.

Figure 1:
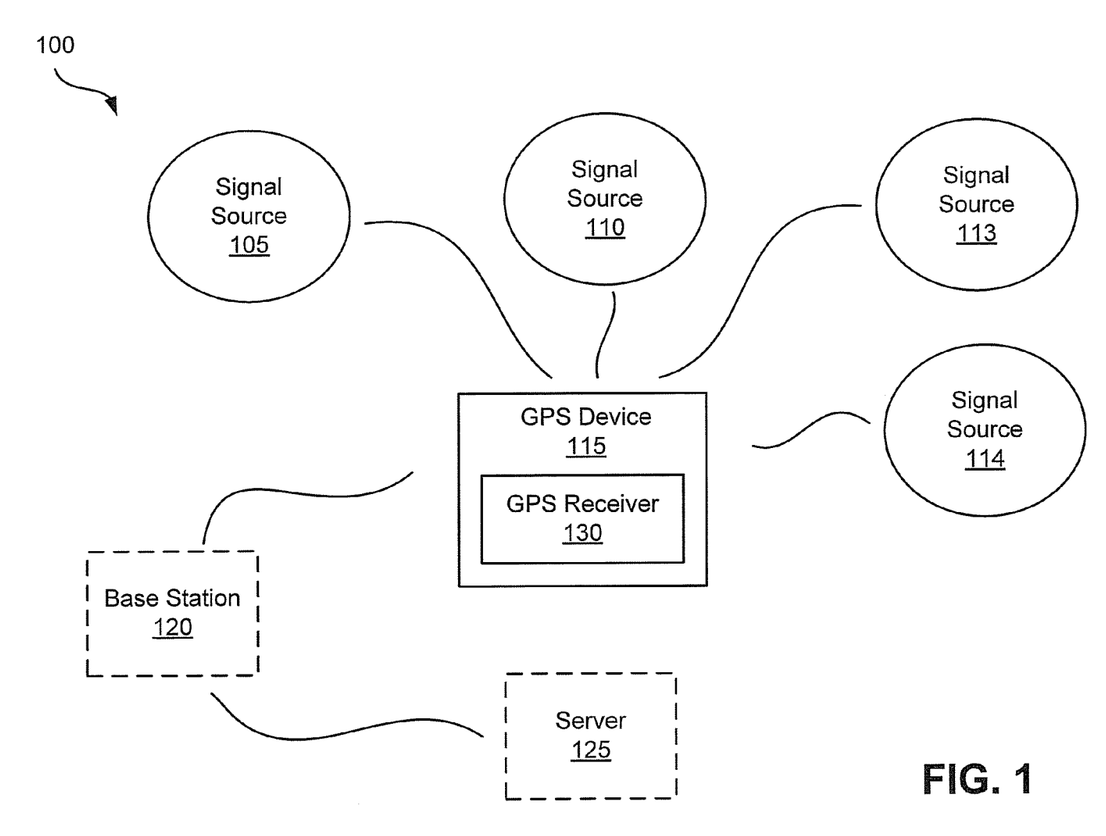
FIG. 1 is a block diagram that illustrates a system 100 having a global positioning system (GPS) device that calibrates a RTC time using resources within the GPS device.

Referring now to FIG. 1, which is a block diagram that illustrates a system 100 having a global positioning system (GPS) device 115 that calibrates the RTC time using resources within the GPS device 115. A simple system 100 includes a plurality of signal sources 105, 110, 113, 114 and a GPS device 115. Alternatively or additionally, a more complex system 100, such as an assisted global positioning system (AGPS), further comprises a base station 120 and a server 125. Although only one GPS device 115, one base station 120, and one server 125 are shown in the system 100, the system 100 can include multiple GPS devices, multiple base stations and/or multiple servers. Alternatively or additionally, the server 125 may be co-located with the base station 120 (e.g., Server Generated Extended Ephemeris) or with the GPS device 115 (e.g., Client Generated Extended Ephemeris).

The signal sources 105, 110, 113, 114 include GPS satellites (also known as space vehicles), among others. The signal sources 105, 110, 113, 114 generally orbit above the location of the GPS devices 115 at any given time. The GPS devices 115 include, but are not limited to, GPS receivers 130, cell phones with embedded signal receivers, and personal digital assistants (PDAs) with embedded signal receivers, among others. The GPS devices 115 further includes a calibration manager 290, which is described further in relation to FIGS. 3-5. The signal sources 105, 110, 113, 114 transmit signals to the GPS devices 115, which use the signals to determine the location, speed, and heading of the GPS devices 115.

In an AGPS system, a GPS assistance server 125 assists the GPS devices 115, such as a Mobile Station (MS) client (e.g., a cellular phone) in obtaining a position fix on the client's position. In one embodiment of the AGPS, the MS client 115 sends GPS measurements to the GPS server 125, which then calculates the client's position. For an accurate 3-D position fix the MS client 115 generally receives signals from four satellites 105, 110, 113, 114.

Figure 2:
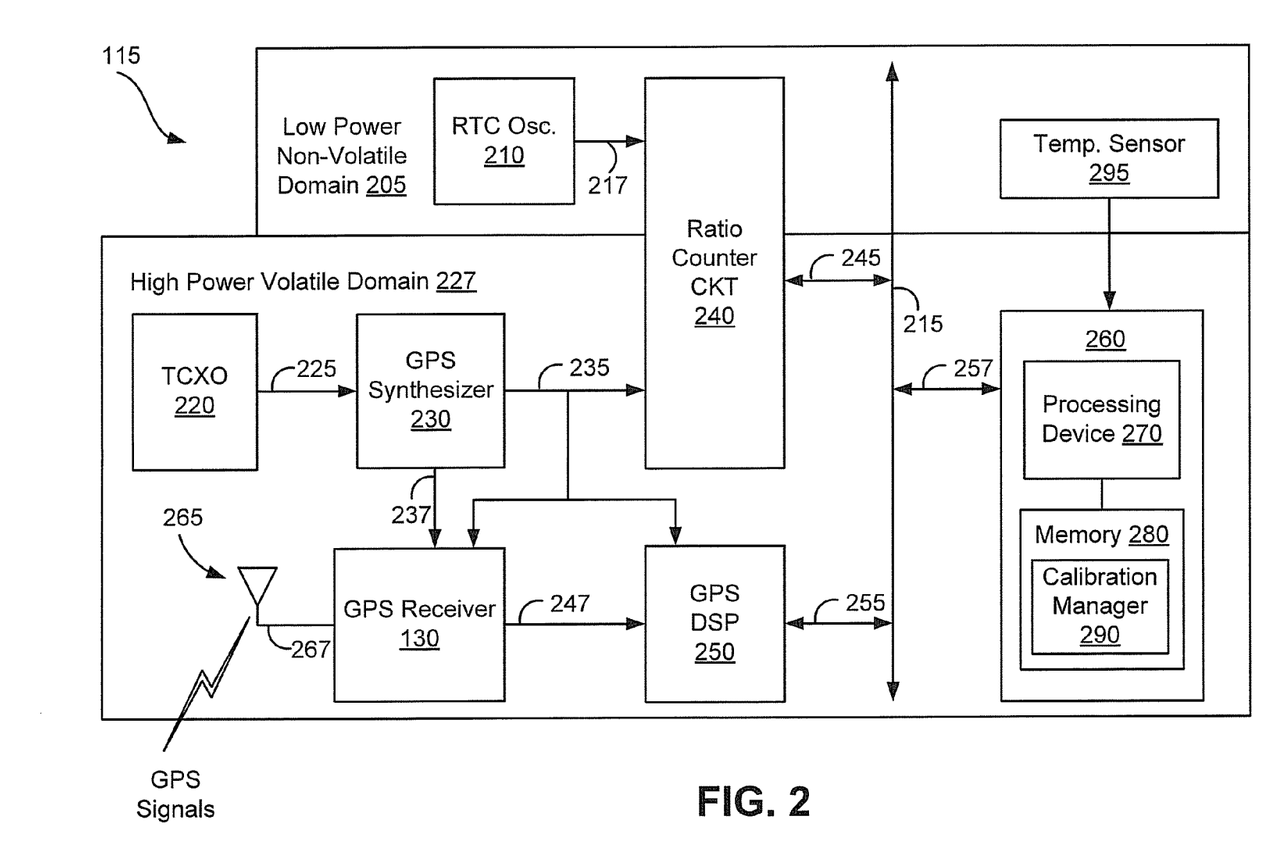
FIG. 2 is a high-level block diagram that illustrates an embodiment of a GPS device, such as that shown in FIG. 1.

When the GPS device 115 is in low power operation, GPS time is generally maintained based on a RTC oscillator 210 (FIG. 2). There is significant value in an ability of the GPS device 115 to maintain more accurate GPS time by calibrating a RTC time that is based on the RTC oscillator 210 and using the resources of the GPS device 115. In general, the disclosure provides a GPS device 115 that compensates the temperature related frequency variation of the RTC oscillator 210 by using the frequency accuracy of a TXCO 220 (FIG. 2) during full power receiver operation to provide accurate calibration of the RTC time on a low power duty cycled basis. The RTC time can be maintained for periods ranging from, for example, hours to weeks.

By accurately calibrating the RTC time, the GPS device 115 improves performance in terms of the length of time that the error in the RTC time can be held below a time accuracy limit. Such time accuracy limits include, but are not limited to, the following: 1) bit sync accuracy defined as a time error of ±250 μs and 2) coarse time accuracy defined as ±1 s. The systems and methods of calibrating the RTC time is further described in relation to FIGS. 2-7.

FIG. 2 is a high-level block diagram that illustrates an embodiment of a GPS device 115, such as that shown in FIG. 1. The general approach is to maintain the RTC time that is based on the RTC oscillator 210 while in a low power state. The GPS device 115 includes the RTC oscillator 210 and the TCXO 220 that generates and sends RTC clock signals and TCXO clock signals via lines 217 and 225, 235 to a ratio counter circuitry 240, respectively.

The ratio counter circuitry 240 determines a frequency ratio by comparing the RTC clock signals and the TCXO clock signals and sends the frequency ratio to a computing device 260 using a local interface 215 via lines 245, 257. The ratio counter circuitry 240 is further described in relation to FIGS. 3 and 5. The computing device 260 estimates a current RTC frequency based on the received frequency ratio. The computing device 260 is configured to calibrate an estimated RTC time based on a prior estimated RTC frequency, the current RTC frequency and an elapsed time between the prior estimated RTC frequency and current estimated RTC frequency.

The computing device 260 includes a processing device 270 and memory 280 that includes a calibration manager 290. Such calibration manager 290 includes instructions that are executed by the processing device 270. The instructions include the logic that are similar to the steps described in relation to FIGS. 4, 6 and 7. The computing device 260 is further described in relation to FIG. 8.

The TCXO 220 sends the TCXO clock signals to a GPS synthesizer 230 via line 225, which synthesizes additional clock signals and sends the synthesized signals to a GPS receiver 130, ratio counter circuitry 240, and GSP digital signal processor (DSP) 250 via lines 237, 235, respectively. The TCXO signal 225 may also be sent directly to ratio counter circuitry 240. The GPS DSP 250 can communicate with the computing device 260 using a local interface 215 via lines 255, 257 to compute, for example, a navigation solution. The computing device 260 can be electrical coupled to a temperature sensor 295 that can facilitate calibrating the RTC time. This is further described in relation to FIG. 7.

A. Calibration of RTC Time Using Conventional Ratio Counter

Figure 3:
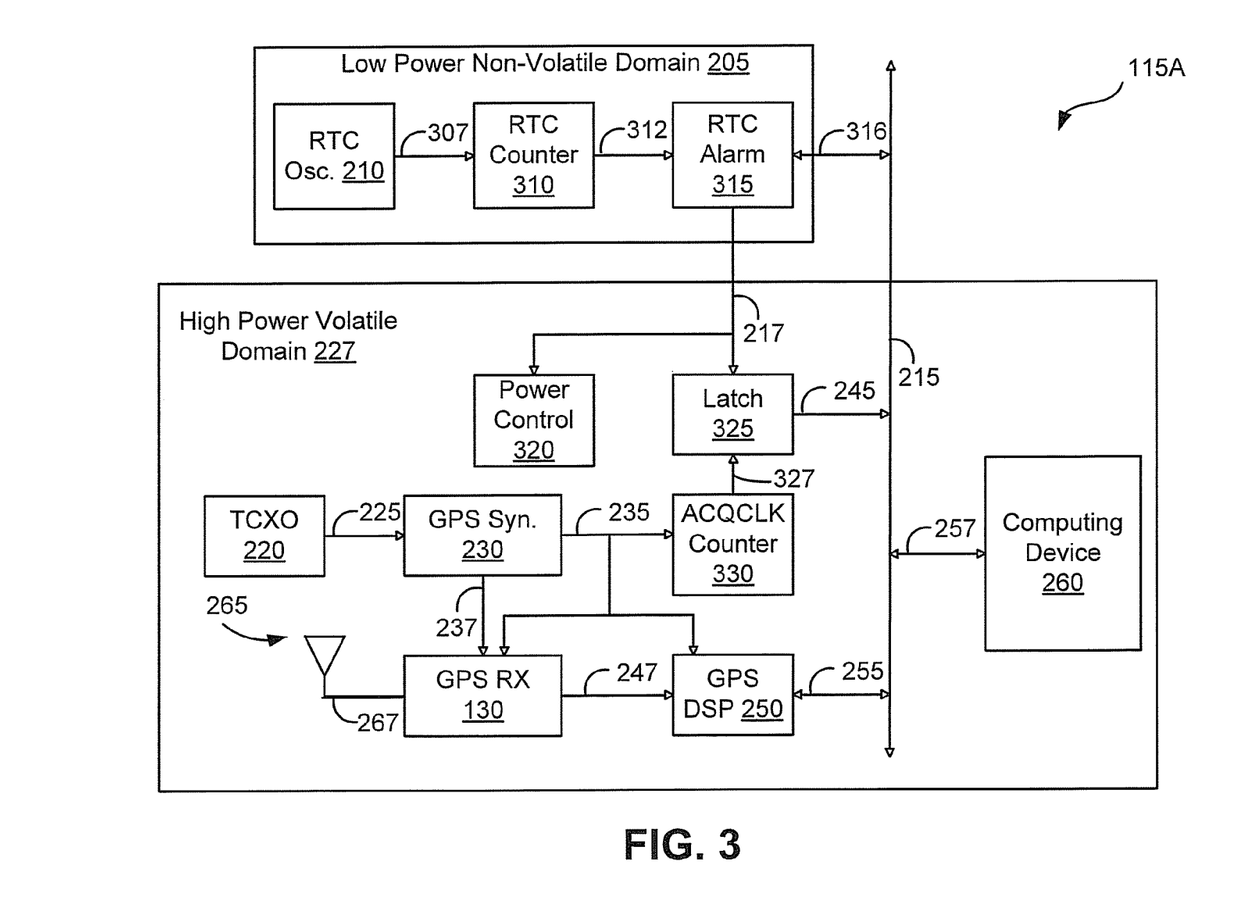
FIG. 3 is a block diagram that illustrates an embodiment of a ratio counter circuitry, such as that shown in FIG. 2.

FIG. 3 is a block diagram that illustrates an embodiment of a ratio counter circuitry 240, such as that shown in FIG. 2. In this example, the ratio counter circuitry 240 is a conventional ratio counter that includes the RTC oscillator 210, a RTC counter 310, and a RTC alarm 315, all of which can reside in a low power non-volatile domain 205. The non-volatile section 205 provides a low power clock based on a low power oscillator 210 and logic circuitry 310, 315, generally, but not necessarily, running at approximately 32768 Hz.

The RTC oscillator 210 sends the RTC clock signals to the RTC counter 310 via line 307, which generates RTC counter values. The RTC alarm receives the RTC counter values via line 312 and generates RTC alarm values and wake signals based on a predetermined RTC counter value. The RTC alarm 315 sends the wake signals to a power control 320 of a high power volatile domain 227. The power control 320 can wake up some electrical components in the high power volatile domain 227. It should be noted that any clock sources could drive the ratio counter circuitry 240. In this example, the clocks are the RTC clock signal via line 217 and either the TCXO clock signal via line 225 or the synthesized ACQCLK signal via line 235.

The ratio counter circuitry 240 further includes a latch 325 and an acquisition clock (ACQCLK) counter 330. Such ACQCLK counter 330 is electrically coupled to the TCXO 220 either directly or via the GPS synthesizer 230 and generates ACQCLK counter values based on the TCXO clock signals. The latch 325 receives RTC alarm values and the ACQCLK counter value from the RTC alarm 315 and ACQCLK counter 330 via lines 217, 327, respectively.

The latch 325 latches the ACQCLK counter value (ACQCLK count) based on receiving the RTC alarm signals via line 217. The RTC counter values at the alarm times and the latched ACQCLK counter values at two or more successive alarm times are used to determine the frequency ratio of the RTC oscillator 210 and the TCXO 220. The ACQCLK signal is the sample timing clock for the local GPS receiver 130. Conceptually, each GPS A/D sample corresponds to a specific value of the ACQCLK counter 330, so that ACQCLK counter value can be viewed as the local receiver time base.

The frequency ratio is the ratio of the difference of the RTC alarm values and ACQCLK counter values at two successive alarm times constituting a ratio measurement period. In other words, the frequency ratio is computed from two sets of counter values—1) the RTC alarm count and 2) ACQCLK latch count—from two different RTC alarm counter values. The computing device 260 can use the respective values to compute the differences between the two RTC counter alarm values and the two ACQCLK counter values 310, 330 and then the differences are used to compute the frequency ratio, which is denoted as R[k] and further described in relation to FIG. 4.

Time can be transferred between the RTC and the ACQCLK counters 310, 330 using the SYNC block latch circuit 325 to an accuracy of one ACQCLK tick. The ACQCLK tick can be, for example, 1/16,369,000 (~61.09 ns). Hence, the accuracy of the transfer is about 492 times more accurate than the RTC counter value when transferring the RTC edge into the ACQCLK counter 330. It should be noted that a RTC circuitry includes some of the electrical components of the ratio counter circuitry 240, such as the RTC oscillator 210, RTC counter 310, and RTC alarm 315.

The GPS receiver 130 runs from the GPS synthesizer 230, which uses the frequency reference, generally from the TCXO 220, to synthesize and send both RF local oscillator (LO) signals and ACQCLK clocks to the GPS receiver 130 and ACQCLK counter 330 via lines 237, 235. The RF LO 237 (FIG. 2) is used in the GPS receiver 130 to convert the GPS RF signals into intermediate carrier (IF) frequency.

The ACQCLK clock is used as the sample clock for the A/D converter (not shown) that samples and quantizes the GPS signal spectrum. The A/D samples are provided to the GPS DSP 250 where the spread spectrum code is removed for a desired number of satellites. The range measurements are made and downlink data from each satellite 105, 110, 113, 114 is demodulated. These measurements and demodulated data are provided to the computing device 260 where the navigation equations are solved to provide the position, time and velocity outputs of the GPS receiver 130.

When referring to RTC accuracy, the time of the RTC clock rising edge is considered to be labeled by the GPS time. This is generally different than the count contained in the RTC counter 310, which resolves time to approximately $1/32768 = 30.52$ μs. This "edge" time can be transferred to or from the receiver time using the timing accuracy of a TCXO 220 (FIG. 2) to make periodic corrections to the RTC time. This calibration is further described in relation to FIGS. 4 and 6. In general, a ratio counter determines a frequency ratio measurement by timing an interval on one clock using the other clock. In other words, the timing accuracy of one clock in measuring an interval on the other clock determines the ratio of their frequencies.

Figure 4:
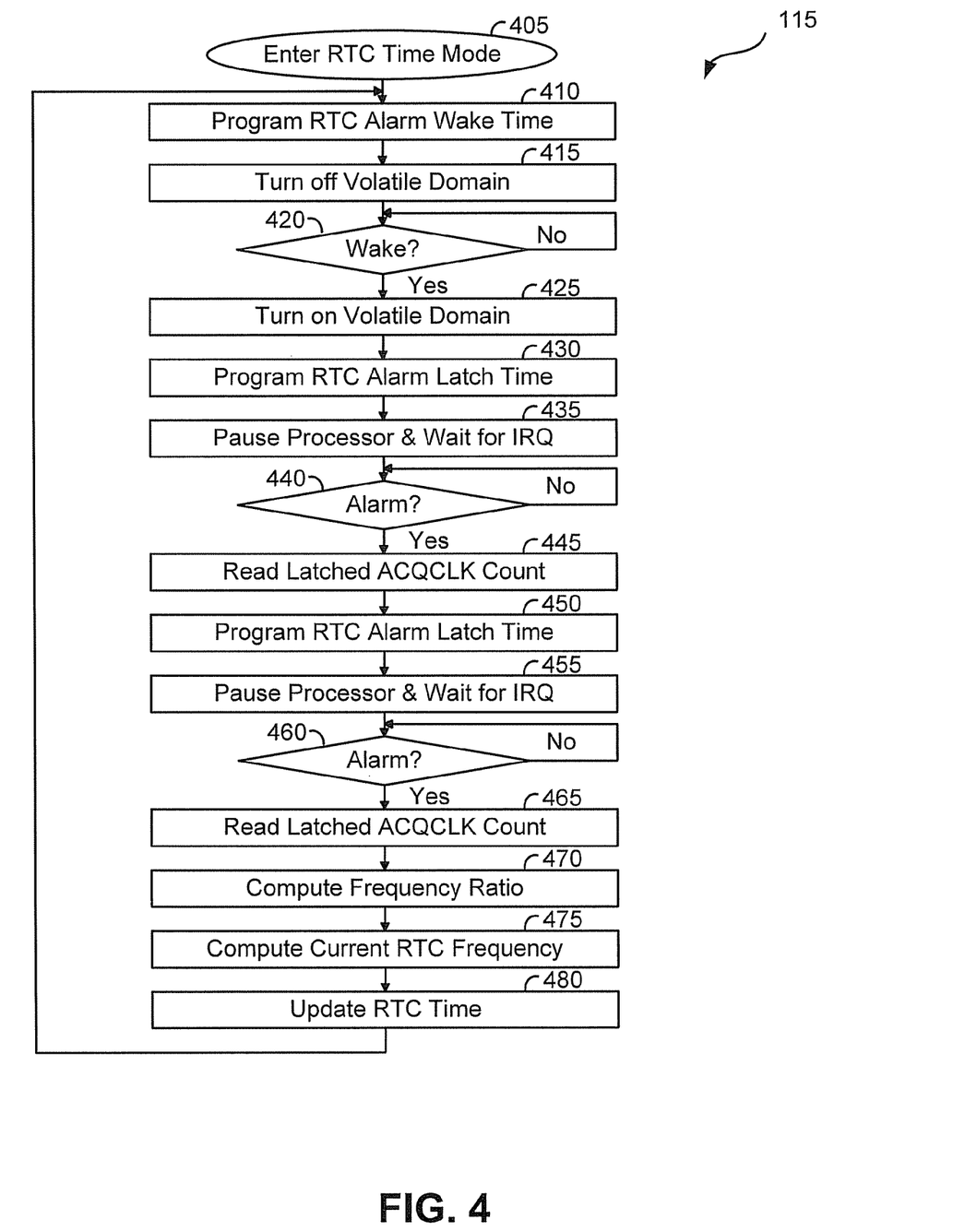
FIG. 4 is a flow diagram that illustrates an embodiment of the architecture, functionality, and/or operation of a GPS device that using a convention ratio counter, such as that shown in FIG. 3, to calibrate a RTC time.

FIG. 4 is a flow diagram that illustrates an embodiment of the architecture, functionality, and/or operation of a GPS device 115A that using a conventional ratio counter, such as that shown in FIG. 3, to calibrate a RTC time. This flow diagram shows exemplary operations used when the GPS device 115A is in the RTC time maintenance mode. This mode can be entered when the GPS device 115A is not computing a GPS navigation solution. By maintaining an accurate RTC time (GPS time) in the RTC circuitry, the GPS device 115A can preserve the ability to obtain a fast TTFF at low maintenance power.

Beginning with steps 405 and 410, the calibration manager 290 enters into a RTC time mode and programs a RTC alarm wake time, respectively. In steps 415 and 420, the calibration manager 290 turns off the electrical components in the high power volatile domain 227 and determines whether an alarm signal was sent by the RTC alarm 315, respectively.

If no alarm signal was sent, step 420 is repeated. If the alarm signal was sent, the calibration manager 290 at step 425 turns on the high power volatile domain 227. At steps 430, 435 and 440, the calibration manager 290 programs the RTC alarm latch time ($C_{RTC}[k,1]$) and waits for the RTC alarm to send the RTC alarm value via line 217. If the RTC alarm value is sent, the latch 325 (FIG. 3) reads the latched ACQCLK count ($C_{ACQ}[k,1]$) from the ACQCLK counter 330 (FIG. 3).

At steps 450, 455 and 460, the calibration manager 290 programs the RTC alarm latch time ($C_{RTC}[k,2]$) and waits for the RTC alarm to send the RTC alarm value via line 217. If the RTC alarm value is sent, the latch 325 reads the latched ACQCLK count ($C_{ACQ}[k,2]$) from the ACQCLK counter 330.

At step 470, the calibration manager 290 computes a frequency ratio ($R[k]$) for the current time interval ($[k, 1-2]$) using the first and second sets of RTC alarm values and ACQCLK counter values based on the following exemplary equation:

$$R[k] = \{C_{RTC}[k,2] - C_{RTC}[k,1]\} / \{C_{ACQ}[k,2] - C_{ACQ}[k,1]\} \quad \text{Eq. 1}$$

At step 475, the calibration manager 290 computes a current RTC frequency ($f_{RTC}[k]$) based on the following exemplary equation:

$$f_{RTC}[k] = R[k] * f_{ACQ} \quad \text{Eq. 2}$$

where $f_{ACQ}$ is a frequency of the ACQCLK counter 330. At step 480, the calibration manager 290 computes a calibrated RTC time ($t_{GPS}[k]$) using the following exemplary equation:

$$t_{GPS}[k] = t_{GPS}[k-1] + 2 * \frac{\{C_{RTC}[k-1,2] - C_{RTC}[k,2]\}}{\{f_{RTC}[k-1] + f_{RTC}[k]\}} \quad \text{Eq. 3}$$

where $f_{RTC}[k-1]$ and $f_{RTC}[k]$ are the previous and current frequency of the RTC oscillator 210 and $C_{RTC}[k-1,2]$ and $C_{RTC}[k,2]$ are the previous and current measurement period end point RTC counter alarm values of the RTC counter 310. The calibrated RTC time ($t_{GPS}[k]$) is the estimated GPS time at the RTC clock edge associated with the last captured RTC counter value. This same estimate is associated with the ACQCLK count latched by this RTC edge. The latching mechanism is the method used to transfer the GPS time estimate between the RTC edges and the ACQCLK count values.

When GPS navigation solutions are being produced, the navigation equation solution provides a precise estimate of the ACQCLK time error and the ACQCLK frequency error. These GPS solution calibrations are used to estimate the GPS time at each ACQCLK count value after the GPS solution is produced. When the RTC time mode is entered again, this more precise time is transferred to the RTC time edges by using the RTC alarm 315 to latch the ACQCLK count value. The GPS time estimate at that ACQCLK count value is used as the initial value of GPS time for the RTC clock edge that caused the alarm and latch. The RTC time mode is therefore entered with an accurate GPS time estimate associated with the last RTC alarm value.

An exemplary accuracy limitation using the conventional ratio counter is due to the ACQCLK count ambiguity of the latched ACQCLK count at the RTC alarm times. The conventional ratio counter generally cannot determine how close the RTC alarm edge is to an ACQCLK edge. The error can range from zero to one full tick (period) of the ACQCLK. Since there are two measurement points, the error can be viewed as having a range of ±1 ACQCLK tick.

Considering the effects of these errors on the estimated RTC time, the time to accumulate one (1) second of error in the RTC clock estimate of GPS time can be calculated. The results in Table 1 below show the time to reach one second of error for the various cases of no error and plus or minus one ACQCLK tick. A typical nominal measurement period between the two RTC alarms of 200 ms is assumed. Note that even in the best case, the error is not zero, since the number of RTC ticks and ACQCLK ticks in a measurement period are generally not a ratio of integers.

In Table 1 below, the exemplary case has 6553 RTC ticks as the close approximation of 200 ms. Within that interval, the closest count of ACQCLK ticks is approximately 3273500. Then, in addition, the ACQCLK count can vary by ±1 tick from this nominal. The results show that RTC time can be maintained to one (1) second accuracy for a few minutes according to calculations using the conventional ratio counter.

TABLE 1

Conventional Ratio Counter Performance

| Case | Ratio | Estimated $f_{RTC}$ | Error - sec/sec | Time to Accumulate 1 Second of Error - sec |
|---|---|---|---|---|
| Nominal | 499.54219441 | 32768.00274935 | 0.00274935 | 363.72 |
| +1 Tick | 499.54234702 | 32767.99273927 | −0.00726073 | −137.73 |
| −1 Tick | 499.54204181 | 32768.01275944 | 0.01275944 | 78.37 |

Note that the error in Table 1 is due generally to the accuracy of the conventional ratio counter. It is assumed that the calibration of the GPS time is performed often enough that the change in frequency between the executions of the calibrations at successive wake times is small enough that an average of the two estimated RTC frequencies is accurate enough to ignore relative to the error due to the frequency ratio. Better estimation methods can be applied, such as assuming linear change in frequency and integration of the frequency change as a function of time between the two wake times to arrive at the time correction factor.

B. Calibration of RTC Time Using Edge Aligned Ratio Counter

Figure 5:
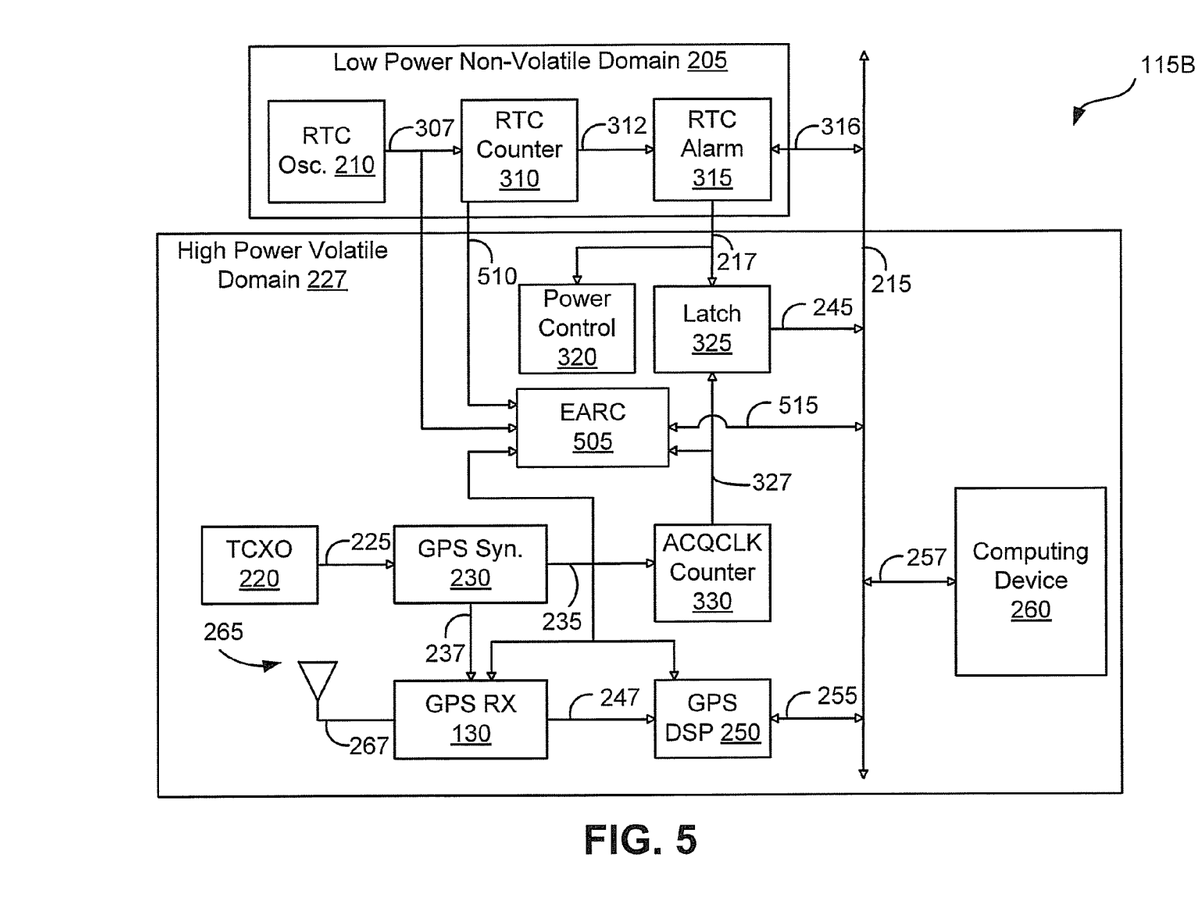
FIG. 5 is a block diagram that illustrates another embodiment of a ratio counter circuitry, such as that shown in FIG. 2.

FIG. 5 is a block diagram that illustrates another embodiment of a ratio counter circuitry, such as that shown in FIG. 2, which uses an edge aligned ratio counter (EARC) 505 to calibrate a RTC time. The GPS device 115B shown in FIG. 5 has a similar architecture of the GPS device 115A described in relation to FIG. 3; thus, includes the RTC oscillator 210, RTC counter 310, RTC alarm 315, power control 320, latch 325, TCXO 220, GPS synthesizer 230, ACQCLK counter 330, computing device 260, GPS receiver 130, and GPS DSP 250.

The GPS device 115B further includes the EARC 505 that takes advantage of the ability to latch the RTC and ACQCLK counts from the RTC and ACQCLK counters 310, 330 via lines 510, 327 for two different clocks from the RTC oscillator 210 and TCXO 220 via lines 307, 235 at a point in time where the edges of the two clocks are precisely aligned. Consequently, the number of counts of both clocks can be very nearly a ratio of integers over a measurement period.

One of the disadvantages, among others, of using the EARC 505 with the RTC and ACQCLK counters 310, 330 is that the RTC oscillator 210 has a very wide frequency variation over temperature. This makes it difficult to select a set of parameters r0 and r1 for the EARC 505 which can work correctly over the full range of expected RTC frequencies. Values can be found that span the range of RTC frequency error from approximately −250 PPM to +50 PPM, which is an exemplary frequency variation over a temperature range of approximately −40° C. to +85° C. for 32,768 Hz watch crystals. These values, {r0, r1}={499, 500}, are sufficient to provide good results over a 200 ms measurement period. Other values can be chosen to satisfy other temperature ranges, frequency error ranges, crystal frequencies or crystal types.

As in the case of the simple ratio counter, a periodic estimate is made of the ratio of the RTC and ACQCLK frequencies at the current temperature. However, the EARC 505 is capable of making the ratio measurement by latching counter values via lines 510, 327 when the edges of the RTC and ACQCLK clocks via lines 307, 235 are closely aligned in time. Consequently, the ±1 ACQCLK cycle ambiguity of the simple ratio counter can be avoided using the EARC 505 for ratio measurement, which is further described in relation to FIG. 6.

Figure 6:
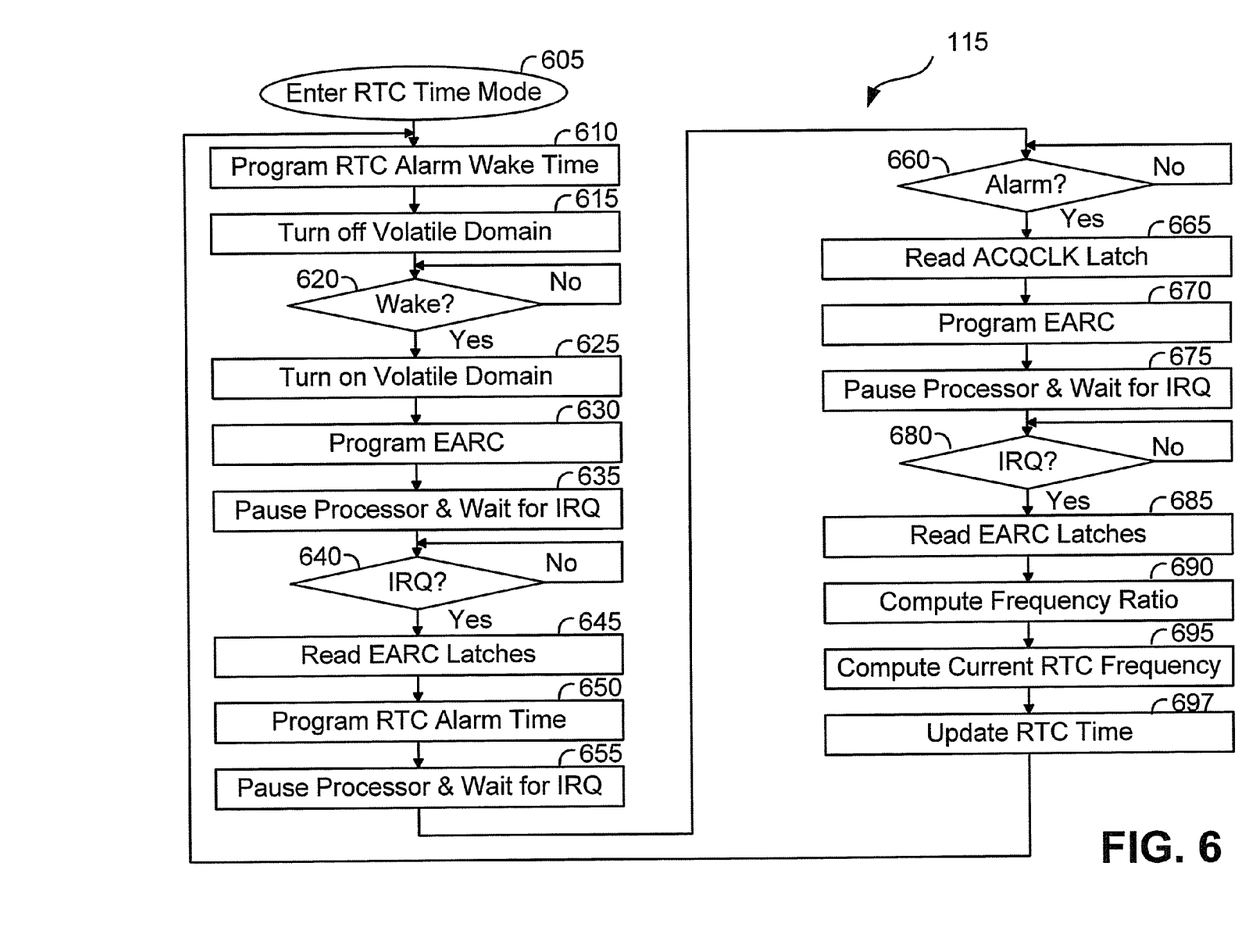
FIG. 6 is a flow diagram that illustrates an embodiment of the architecture, functionality, and/or operation of a GPS device that using an edge aligned ratio counter, such as that shown in FIG. 3, to calibrate a RTC time.

FIG. 6 is a flow diagram that illustrates an embodiment of the architecture, functionality, and/or operation of a GPS device that using an edge aligned ratio counter 505, such as that shown in FIG. 5, to calibrate a RTC time. Beginning with steps 605 and 610, the calibration manager 290 enters into a RTC time mode and programs a RTC alarm wake time, respectively. In steps 615 and 620, the calibration manager 290 turns off the electrical components in the high power volatile domain 227 and determines whether an alarm signal was sent by the RTC alarm 315, respectively.

If no alarm signal was sent, step 620 is repeated. If the alarm signal was sent, the calibration manager 290 at step 625 turns on the high power volatile domain 227. When the GPS device 115 wakes for RTC calibration, the calibration manager 290 at steps 630, 635 and 640 programs the EARC 505 (FIG. 5) and waits for an edge alignment of the clocks via lines 307, 235 to occur. When the alignment occurs, the EARC 505 latches the RTC and ACQCLK counter values via lines 510, 327. These values are read by the computing device 260 to collect the first set of counter values ($C_{RTC}[k,1]$ and $C_{ACQ}[k,1]$) at step 645.

At steps 650, 655, 660 and 665, the calibration manager 290 programs the RTC alarm for a suitable delay, $C_{RTC}[k,0]$, approximately 200 ms. This delay provides an time interval before taking the second set of EARC latched counter values. The RTC alarm 315 is further programmed to latch a value ($C_{ACQ}[k,0]$) of the ACQCLK counter 330. This RTC-ACQCLK counter pair is used as the time correction point for the calibration.

At steps 670, 675, 680, and 685, the calibration manager 290 programs the EARC 505 and waits for another edge alignment of the clocks via lines 307, 235 to occur. When the alignment occurs, the EARC 505 latches the second set of RTC and ACQCLK counter values via lines 510, 327. These values are read by the computing device 260 to collect the second set of counter values ($C_{RTC}[k,2]$ and $C_{ACQ}[k,2]$).

The computing device 260 then has sufficient data to calibrate the RTC for the current time interval. At step 690, the calibration manager 290 computes a frequency ratio (R[k]) for the current time interval ([k,1−2]) using the first and second sets of counter values from the EARC 505 using the previously mentioned equation 1. At step 695, the calibration manager 290 computes a current RTC frequency ($f_{RTC}[k]$) using the previously mentioned equation 2. At step 697, the calibration manager 290 computes a calibrated RTC time ($t_{GPS}[k]$) using the previously mentioned equation 3.

Note that the calibration point is taken as the RTC/ACQCLK time point, $C_{RTC}[k,0]$ and $C_{ACQ}[k,0]$, where the corrected GPS time for these counter values is $t_{GPS}[k]$. While the method using the EARC 505 disclosed in FIG. 6 is very similar to the method disclosed in FIG. 4, the results are considerably more accurate. As can be seen from Table 2, the GPS device 115B can maintain less than one second of accumulated error for many days.

TABLE 2

EARC Method Performance
200 ms measurement time
r0/r1 499/500

| PPM | Hours | Days |
|---|---|---|
| | Time to 1 second Error - Sec | |
| 50 | 26343.12 | 1097.63 |
| 0 | 10765.48 | 448.5618 |
| −50 | 6764.81 | 281.867 |

TABLE 2-continued

EARC Method Performance
200 ms measurement time
r0/r1 499/500

| PPM | Hours | Days |
|---|---|---|
| −100 | 4931.85 | 205.4937 |
| −150 | 3880.34 | 161.681 |
| −200 | 3198.36 | 133.2651 |
| | Time to 250 µS Error - Sec | |
| 50 | 6.585779 | 0.274407 |
| 0 | 2.691371 | 0.11214 |
| −50 | 1.691202 | 0.070467 |
| −100 | 1.232962 | 0.051373 |
| −150 | 0.970086 | 0.04042 |
| −200 | 0.799591 | 0.033316 |

In addition, with the EARC 505, the GPS device 115B can maintain bit sync (±250 µs) for a useful period of time, on the order of a few hours near room temperature, for example. However, Table 2 accounts for the error effects of the EARC 505 and does not account for an inherent error in the TCXO 220. In some cases, the last TCXO drift value from the navigation solution can be assumed to have low error. However, since the GPS device 115B could be calibrating the RTC 210 versus the TCXO 220 for an extended period, there could be enough temperature change that the full temperature uncertainty of the TCXO 220 could be experienced. Table 3 shows the analysis for inherent TCXO uncertainty.

TABLE 3

TCXO Uncertainty Effects

| TCXO PPM | Sec | Hours | Days |
|---|---|---|---|
| | Time to 1 second Error - Sec | | |
| 0.5 | 2000000 | 555.5555556 | 23.14814815 |
| 2.5 | 400000 | 111.1111111 | 4.62962963 |
| | Time to 250 µS Error - Sec | | |
| 0.5 | 500 | 0.138888889 | 0.005787037 |
| 2.5 | 100 | 0.027777778 | 0.001157407 |

The number of days to accumulate one (1) second of error can be substantial for a 0.5 PPM TCXO and is still greater than two (2) days for a 2.5 PPM TCXO, for example. It can be seen however, that the TCXO uncertainty is dominating the EARC uncertainty. Further, the time that bit sync level accuracy can be maintained can be so short that it is no longer very useful. While this level of performance is extremely useful, the desire would be to extend the bit sync level of performance to a longer period of time in order to avoid the need to perform bit sync and the associated power required for this operation.

C. EARC with TCXO Calibrated Using RTC as Temperature Sensor

As previously mentioned, the basic temperature uncertainty of the TCXO 220 can be a limiting factor for maintaining bit sync level time accuracy for useful time periods. One method to address the temperature uncertainty is to use the RTC 210 as a temperature sensor. In general, the computing device 260 can compare a TCXO frequency of the TCXO clock signals to a RTC frequency of the RTC clock signals and compute a frequency ratio based on the comparison. Since the RTC frequency is far more sensitive to temperature than the TCXO frequency (e.g., RTC frequency varies 200 PPM over approximately −40° C. to +85° C.), the TCXO frequency can be compared to the RTC frequency and current RTC frequency can be estimated. The estimated RTC frequency from the prior wake event, the current estimate and the elapsed time of the RTC 210 can then be used to correct and calibrate the estimated GPS time on the RTC 210 at the alarm time. The effect of this procedure is to provide RTC timekeeping accuracy comparable to the TCXO with the low power consumption of the RTC. A more detailed explanation of using the RTC as a temperature sensor is as follows.

The system block diagram remains such that shown in FIG. 5. The operations to calibrate the TCXO 220, or equivalently the ACQCLK counter 330, are carried out when the GPS device 115B is in navigation mode. There are many variations on the navigation mode. The two basic notions, however, are a mode that navigates continuously and a mode that navigates with a duty cycle. The duty cycled modes are used to reduce the average power at the cost of allowed system dynamics. System dynamics constraints are on the navigation platform, principally in terms of limits on velocity and acceleration.

Figure 7:
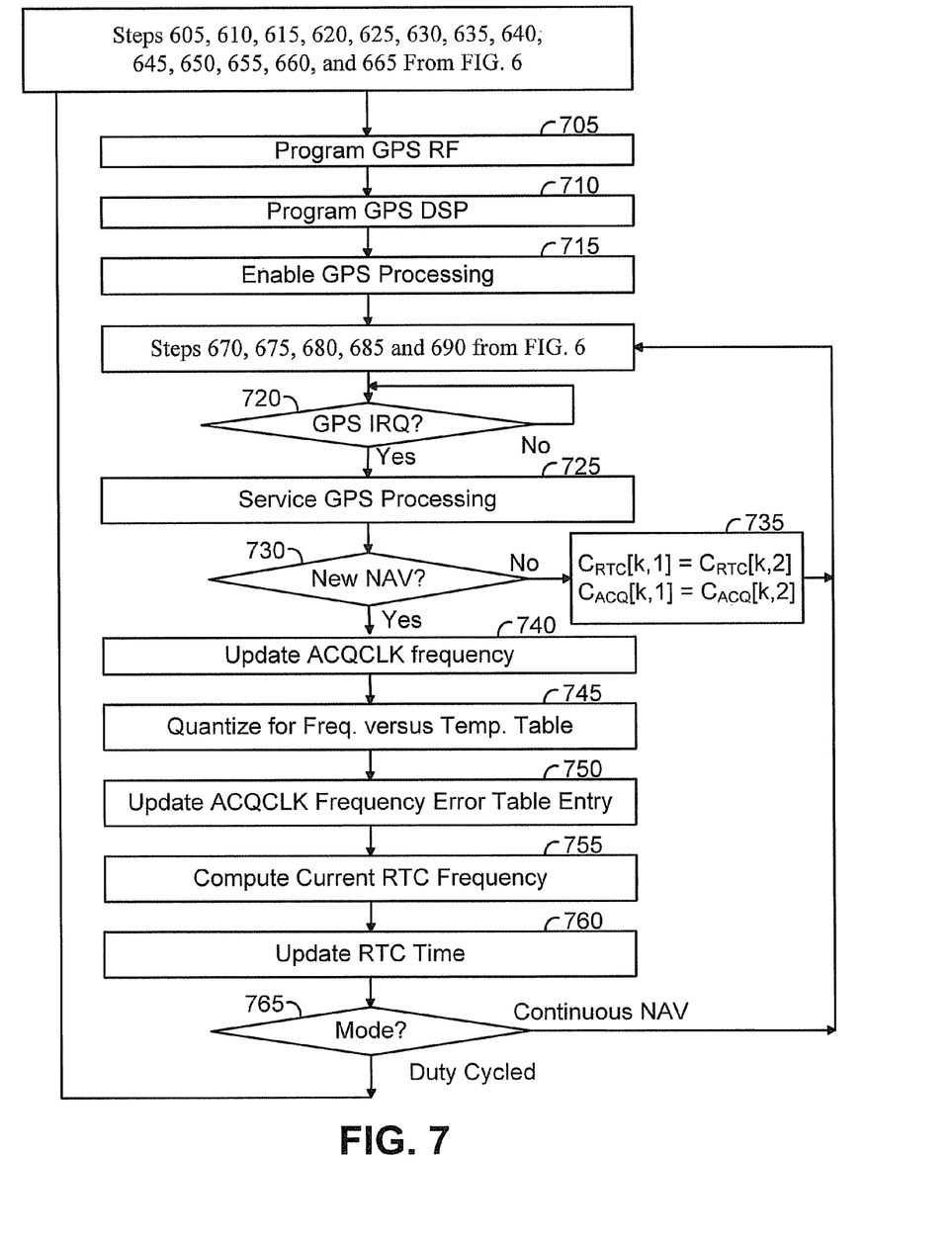
FIG. 7 is a flow diagram that illustrates an embodiment of the architecture, functionality, and/or operation of a GPS device, such as that shown in FIG. 5, to calibrate a TCXO.

FIG. 7 is a flow diagram that illustrates an embodiment of the architecture, functionality, and/or operation of a GPS device, such as that shown in FIG. 5, to calibrate a TCXO. For simplicity, the transition to navigation mode is assumed to be made on entering the low power mode, so that the new mode begins at the next wake event.

The initial processing establishes two items using steps 605, 610, 615, 620, 625, 630, 635, 640, 645, 650, 655, 660, and 665 as previously discussed in relation to FIG. 6. First, the initial set of EARC counter values at an edge alignment is captured, referred as $C_{RTC}[k,1]$ and $C_{ACQ}[k,1]$. Second, the RTC alarm 315 is used to capture a correspondence between the RTC clock time and the GPS systems time. This correspondence is used to transfer the RTC clock estimate of GPS system time into the local GPS receiver timing system expressed by ACQCLK count. The previous estimate of GPS time is propagated to the alarm time ($C_{RTC}[k,0]$) by methods discussed previously. This same GPS time estimate is then associated with the latched ACQCLK count ($C_{ACQ}[k,0]$).

With this estimate of GPS time installed in the receiver timing, GPS signal acquisition can proceed using steps 705, 710 and 715. The GPS receiver 130 (FIG. 1) and GPS DSP 250 (FIG. 2) are programmed and GPS operation is enabled. Generally, the initial operations are signal acquisition. This process would be controlled and supervised by the computing device 260. These details are not shown in the flow chart as they are not relevant to the calibration processes being discussed.

Steps 670, 675, 680, 685 and 690 from FIG. 6 are used to capture the second set of EARC counter values and calculate a current frequency ratio of RTC to ACQCLK frequency. However, this frequency ratio is the effective current "temperature" of the TCXO 220. Since the ACQCLK frequency variation with temperature is generally 0.5 PPM, while the RTC variation with temperature is approximately 200 PPM, the ACQCLK counter 330 is providing a reference against which to view the temperature induced frequency change of the RTC.

At steps 720, 725, 730 and 735, the GPS navigation status is checked, for example, once per 100 ms, while a new navigation solution is computed, for example, once per second. Hence, if there is no new GPS solution, steps 670, 675, 680, 685 690, 720, 725, 730 and 735 repeat with a next set of EARC counter values. If a new GPS solution has been computed, the calibration part of the algorithm can be executed at steps 740, 745, 750, 755, 760 and 765. One of the items the GPS navigation solution calculates is the error in the local frequency reference. This is provided in the form of the error in the ACQCLK rate, generally in Hz or in PPM, and is typically referred to as the local clock drift error term of the solution, denoted here as NAV(drift). The drift value is used to calibrate the current estimate of the ACQCLK frequency at step 740 using the following exemplary equation.

$$f_{ACQ}[k]=f_{ACQ-NOM}+NAV(\text{drift}) \quad \text{Eq. 4}$$

where $f_{ACQ-NOM}$ is a nominal ACQCLK frequency.

At step 745, the values to be used in the ACQCLK frequency error frequency versus temperature table are quantized using the following exemplary equations.

$$E_{ACQ}=\text{Integer}((NAV(\text{drift})+\tfrac{1}{2}LSB_{ACQ})/LSB_{ACQ}) \quad \text{Eq. 5}$$

$$R_{ACQ}=\text{Integer}((R[k]+\tfrac{1}{2}LSB_{RATIO})/(LSB_{RATIO}) \quad \text{Eq. 6}$$

where the error value $E_{ACQ}$ and the ratio-based "temperature" value $R_{ACQ}$ are quantized to suitable resolutions, corresponding to least significant bit weights $LSB_{ACQ}$ and $LSB_{RATIO}$, respectively.

It should be noted that the frequency versus temperature table is one method of calibration. Other methods include curve fitting methods. In the case of the table approach, one method that can be used is to filter successive estimates of frequency error at each possible ratio value. Filtering the values reduces noise in the estimates and also accommodates "aging" of the crystals. Aging is a well known phenomenon in which the frequency of the crystal at a given temperature slowly drifts with time. Hence, rather than recording the frequency error, the prior value of error at the same ratio is combined with the new estimate according to some filtering scheme.

At step 750, each quantized value of $R_{ACQ}$ represents one table entry for frequency error. The frequency errors for that quantized value of ratio are filtered and stored in the corresponding table array indexed location. For the typical error value ($E_{ACQ}$), the current value at the ratio index ($R_{ACQ}$) is $T_{ACQ}[R_{ACQ}]$, where the frequency error ($T_{ACQ}[R_{ACQ}]$) is associated with the effective temperature ratio ($R_{ACQ}$).

$$T_{ACQ}[R_{ACQ}]=(1-\beta)*T_{ACQ}[R_{ACQ}]+\beta*E_{ACQ} \quad \text{Eq. 7}$$

Note that the frequency versus temperature table is not immediately used for RTC time maintenance while in navigation mode. It will be used later during RTC time maintenance mode, as previously shown in FIG. 6. The frequency versus temperature table is, however, used in navigation mode as the estimate of ACQCLK frequency when the navigation solution is not yet available. It provides the estimate of local receiver frequency error during initial GPS signal acquisition. After the calibration operation is complete, the current estimates of RTC frequency ($f_{RTC}[k]$) and RTC time ($t_{GPS}[k]$) are calibrated at steps 755 and 760 based on the respective exemplary equations:

$$f_{RTC}[k]=R[k]*f_{ACQ}[k] \quad \text{Eq. 8}$$

$$t_{GPS}[k]=NAV(t_{GPS}) \text{ at } C_{RTC}[k,2] \text{ and } C_{ACQ}[k,2] \quad \text{Eq. 9}$$

Note that these calibrations use the correction terms output by the navigation solution, since these are far more accurate than the calibration based methods. Just as the ACQCLK frequency is calibrated using the NAV(drift), the RTC frequency uses this ACQCLK frequency estimate and the current RTC/ACQCLK ratio to estimate RTC frequency. The RTC time is corrected using the clock error, or bias, term from the navigation solution. The calibrated RTC frequency and time can then be propagated forward in time from the point of calibration.

At the end of the calibration/NAV cycle, a decision is made between continuous navigation or duty cycled navigation at step 765. In this simplified version of the calibration method, either the calibration method loops back to the top of the continuous navigation loop at step 670 of FIG. 7 or it loops back to the top of the overall navigation mode at step 605 of FIG. 7 and enters low power state for some programmed length of time. At the next wake time, the process repeats as already described.

During RTC time maintenance mode, the method of calibrating the RTC time as shown in FIG. 6 is slightly modified to use the frequency versus temperature table to take advantage of the calibrated ACQCLK. Most of the steps in FIG. 6 are used except for step 695. As previously mentioned, the current ratio is quantized and used to access the ACQCLK frequency error at the current ratio ($R_{ACQ}$), or "temperature." The calibration manager 290 computes the current RTC frequency using the following exemplary equation:

$$f_{RTC}[k]=R_{ACQ}(f_{ACQ}(\text{Nominal})+T_{ACQ}[R_{ACQ}]) \quad \text{Eq. 10}$$

where the error value ($T_{ACQ}[R_{ACQ}]$) from the frequency versus temperature table is added to the nominal ACQCLK frequency ($f_{ACQ}(\text{Nominal})$) and the sum is multiplied by the current ratio to get a more accurate estimate of the current RTC frequency ($f_{RTC}[k]$). Other than this modification at step 695, the method of FIG. 6 remains the same.

The TCXO (or ACQCLK) accuracy effects previously listed in Table 3 can now be calibrated for the case of a calibrated TCXO. The improved performance is shown in Table 4. The resulting accuracy limitation due to the TCXO 220 is now reduced to the point that it is no longer the limiting factor and is compatible with the errors due to the EARC process. Hence it would be possible to maintain bit sync accuracy for on the order of an hour and 1 second accuracy for the order of days.

D. External Temperature Aiding

Another ambiguity that results from the symmetry of the RTC temperature versus frequency characteristic about its crystal inflection point, approximately 25° C. The effect of this symmetry is that the frequency versus temperature table is folded over and frequency errors for ratio values at equal offsets from the ratio at the inflection point fall into the same table entry. Both the RTC crystal and the TCXO tend to have flat characteristics over the temperature range near the inflection point. The most dramatic variation in temperature versus frequency tends to be at the temperature extremes which are least frequently experienced. However, a solution to this issue can result in still better performance.

TABLE 4

Calibrated TCXO Accuracy Effects

| ACQ PPM | Sec | Hours | Days |
|---|---|---|---|
| | for 250 us error | | |
| 0.05 | 5000 | 1.388888889 | 0.05787037 |
| 0.1 | 2500 | 0.694444444 | 0.028935185 |
| | for 1 sec error | | |
| 0.05 | 20000000 | 5555.555556 | 231.4814815 |
| 0.1 | 10000000 | 2777.777778 | 115.7407407 |

The RTC oscillator has a parabolic RTC temperature curve that is quasi-symmetric around room temperature; hence, positive and negative excursions from this temperature are stored as common TCXO frequency error estimates. This works fairly well except where the TCXO is likely to meet its temperature specification limits, e.g., the temperature extremes of hot and cold. To avoid this degraded performance, the ambiguity between above and below room temperature can be resolved.

If the GPS device 115 has a temperature sensor 295 (FIG. 2) that can resolve this, the frequency versus temperature table can be unfolded into hot and cold sides and performance is improved. The temperature sensor 295 does not need to be particularly high resolution. The temperature sensor 295 can inform the calibration manager 290 which side of the room temperature point it is currently operating.

Another method that can be used is to observe the trend of the ratio values after entering a mode and predict the temperature based on the observed trend. For example, if the GPS device 115 transitions from a low power mode to a higher power mode such as in continuous navigation mode, the calibration manager 290 can expect the temperature to have an increasing trend because the level of power consumption has increased. Thus, if the ratio continues to increase during this predicted rising temperature, the conclusion is that the GPS device 115 is at a temperature below 25° C., while if the ratio continues to decrease, the conclusion is that the GPS device 115 is above 25° C. This is a consequence of the parabolic shape of the RTC frequency versus temperature characteristic.

By "unfolding" the frequency versus temperature table the performance at the temperature extremes would be significantly improved. Depending on the particular type of TCXO 220 used, unfolding can facilitate achieving the performance previously described in Table 4.

Figure 8:
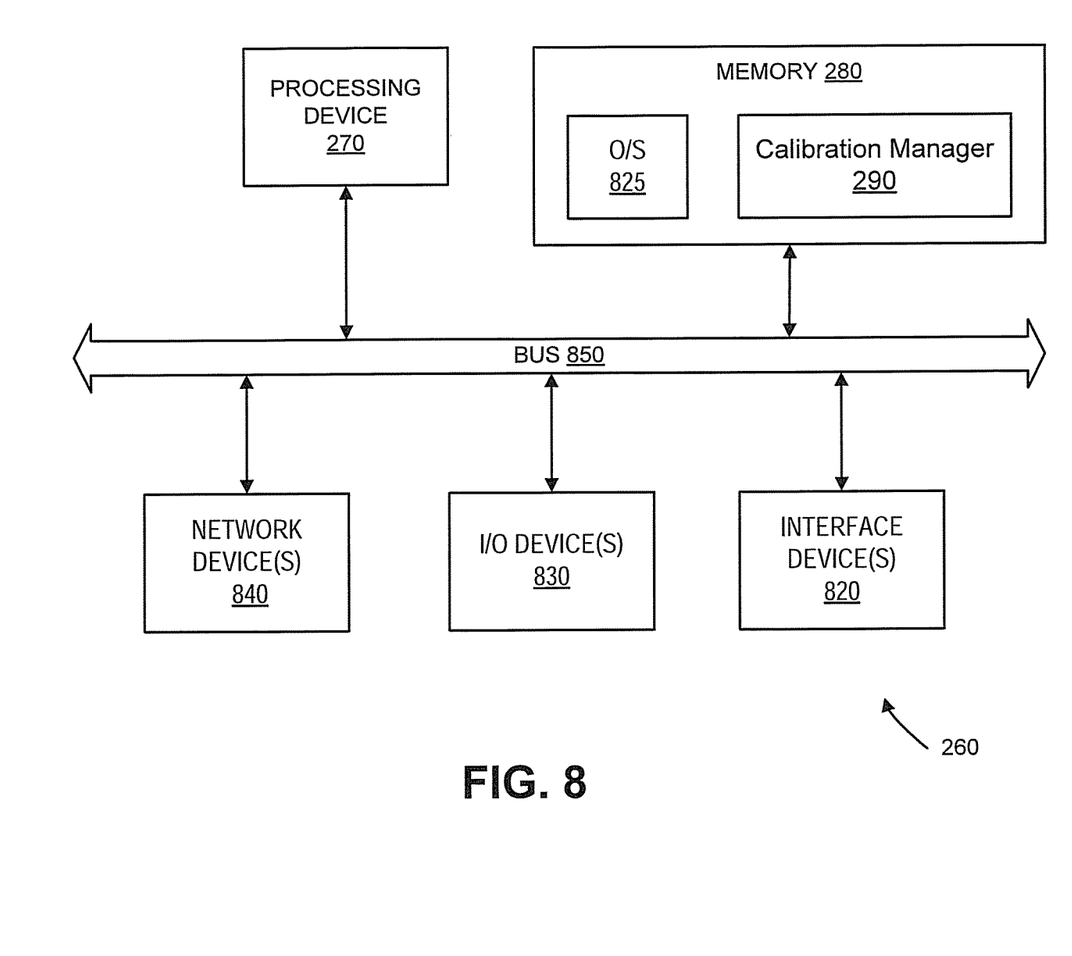
FIG. 8 is a block diagram that illustrates an embodiment of the architecture, functionality, and/or operation of a computing device, such as that shown in FIG. 2.

FIG. 8 is a block diagram illustrating an exemplary architecture for a computing device 260, such as that shown in FIG. 2. As indicated in FIG. 8, the computing device 260 comprises a processing device 270, memory 280, one or more user interface devices 820, one or more I/O devices 830, and one or more networking devices 840, each of which is connected to a local interface 850. The processing device 270 can include any custom made or commercially available processor, a central processing unit (CPU) or an auxiliary processor among several processors associated with the computing device 260, a semiconductor based microprocessor (in the form of a microchip), or a macroprocessor. The memory 280 can include any one or a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 820 comprise those components with which the user (e.g., administrator) can interact with the computing device 260. Where the computing device 260 comprises a server computer or similar device, these components can comprise those typically used in conjunction with a PC such as a keyboard and mouse.

The one or more I/O devices 830 comprise components used to facilitate connection of the computing device 260 to other devices and therefore, for instance, comprise one or more serial, parallel, small system interface (SCSI), universal serial bus (USB), or IEEE 1394 (e.g., Firewire™) connection elements. The networking devices 840 comprise the various components used to transmit and/or receive data over networks (not shown), where provided. By way of example, the networking devices 840 include a device that can communicate both inputs and outputs, for instance, a modulator/demodulator (e.g., modem), a radio frequency (RF) or infrared (IR) transceiver, a telephonic interface, a bridge, a router, as well as a network card, etc.

The memory 280 normally comprises various programs (in software and/or firmware) including an operating system (O/S) 825 and a calibration manager 290. The O/S 825 controls the execution of programs, and provides scheduling, input-output control, file and data management, memory management, and communication control and related services. The calibration manager 290 having instructions that are executed by the processing device 270. The instructions of the calibration manager 290 include logics that are similar to the steps described in the flow chart of FIGS. 4, 6 and 7.

The systems and methods disclosed herein can be implemented in software, hardware, or a combination thereof. In some embodiments, the system and/or method is implemented in software that is stored in a memory and that is executed by a suitable microprocessor (µP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example, but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present disclosure includes embodying the functionality of the preferred embodiments of the present disclosure in logic embodied in hardware or software-configured mediums.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

Therefore, having thus described the disclosure, at least the following is claimed:

1. A GPS device comprising:
   a real time clock (RTC) circuitry that generates RTC clock signals;
   a temperature compensated crystal oscillator (TCXO) that generates and sends TCXO clock signals to a GPS receiver;
   a ratio counter circuitry that receives both the RTC clock signals and the TCXO clock signals and determines a frequency ratio by comparing the RTC clock signals and the TCXO clock signals; and
   a computing device that receives the frequency ratio and estimates a current RTC frequency based on the received frequency ratio, the computing device being configured to calibrate an estimated RTC time being maintained at the RTC circuitry based on an estimated RTC frequency from a prior estimation, the current RTC frequency and an elapsed time of the RTC circuitry,
   wherein the RTC circuitry includes a RTC oscillator, a RTC counter, and a RTC alarm, the RTC oscillator being designed to generate the RTC clock signals, the RTC counter being designed to receive the RTC clock signals and generates an RTC counter value, the RTC alarm being designed to receive the RTC counter value and generates RTC alarm values based on a predetermined RTC counter value,
   wherein the ratio counter circuitry includes an acquisition clock (ACQCLK) counter that is electrically coupled to the TCXO and generates an ACQCLK counter value based on the TCXO clock signals, the ratio counter circuitry further including an edge aligned ratio counter (EARC) that receives the TCXO clock signals from the TCXO, the RTC clock signals from the RTC oscillator, and latches the RTC counter and the ACQCLK counter at a point in time where edges of the RTC clock signals and the TCXO clock signals are aligned, the EARC allowing the computing device to determine the difference in the number of counts from both the RTC counter and the ACQCLK counter as a ratio of count differences of nearly integer clock periods over a measurement period.

2. The GPS device as defined in claim 1, wherein the ratio counter circuitry includes the RTC counter, the RTC alarm, a latch, and an acquisition clock (ACQCLK) counter, the ACQCLK counter being electrically coupled to the TCXO and generates an ACQCLK counter value based on the TCXO clock signals, the latch being configured to receive the RTC alarm values from the RTC alarm and the ACQCLK counter value from the ACQCLK counter, and determines the frequency ratio of the RTC oscillator and the TCXO, the ratio being defined as the ratio of the difference of the RTC alarm values and acquisition count values at two successive alarm times constituting a ratio measurement period.

3. The GPS device as defined in claim 1, wherein the RTC circuitry includes a RTC oscillator that is used to sense a temperature of the TCXO by way of using the frequency ratio of the RTC oscillator and the TCXO as an effective temperature of the TCXO.

4. The GPS device as defined in claim 3, further comprising a GPS receiver and GPS DSP that both facilitate in calculating a navigation drift that is used to calibrate a current estimate of an ACQCLK frequency of the ACQCLK counter, the navigation drift being defined as an estimate of the frequency error of the TCXO at the time and location a navigation solution was computed.

5. The GPS device as defined in claim 4, further comprising a frequency versus temperature table that stores the navigation drift at the effective temperature of the TCXO.

6. A GPS device comprising:
   a real time clock (RTC) circuitry that generates RTC clock signals;
   a temperature compensated crystal oscillator (TCXO) that generates and sends TCXO clock signals to a GPS receiver;
   a ratio counter circuitry that receives both the RTC clock signals and the TCXO clock signals and determines a frequency ratio by comparing the RTC clock signals and the TCXO clock signals; and
   a computing device that receives the frequency ratio and estimates a current RTC frequency based on the received frequency ratio, the computing device being configured to calibrate an estimated RTC time being maintained at the RTC circuitry based on an estimated RTC frequency from a prior estimation, the current RTC frequency and an elapsed time of the RTC circuitry,
   wherein the RTC circuitry includes a RTC oscillator that is used to sense a temperature of the TCXO by way of using the frequency ratio of the RTC oscillator and the TCXO as an effective temperature of the TCXO;
   a GPS receiver and GPS DSP that both facilitate in calculating a navigation drift that is used to calibrate a current estimate of an ACQCLK frequency of the ACQCLK counter, the navigation drift being defined as an estimate of the frequency error of the TCXO at the time and location a navigation solution was computed; and
   a frequency versus temperature table that stores the navigation drift at the effective temperature of the TCXO,
   wherein during a RTC time maintenance mode, the computing device retrieves the navigation drift at the effective temperature from the frequency temperature table, the computing device being configured to add the navigation drift to a nominal ACQCLK frequency, the sum of which being multiplied by the frequency ratio to yield an estimate of the current RTC frequency, the current RTC frequency being used to calibrate the estimated RTC time being maintained at the RTC circuitry.

7. The GPS device as defined in claim 6, further comprising a temperature sensor that senses the temperature of the TCXO and sends the temperature information associated with the sensed temperature to the computing device, which determines whether the sensed temperature is above or below a room temperature since the RTC oscillator has a parabolic RTC temperature curve that is quasi-symmetric around the room temperature, the computing device being configured to select the navigation drift at the effective temperature in the frequency temperature table either above or below the room temperature based on the sensed temperature.

8. The GPS device as defined in claim 6, wherein the computing device tracks the trend of the frequency ratio after a high powered volatile circuitry is turned on to detect that the temperature of the TCXO is either above or below a room temperature since the RTC oscillator has a parabolic RTC temperature curve that is quasi-symmetric around the room temperature, responsive to determining whether the temperature is above or below the room temperature, the computing device being configured to select the navigation drift at the effective temperature in the frequency temperature table either above or below the room temperature based on the tracking of the trend of the frequency ratio.

9. A computing device comprising:
a processing device; and
memory that includes a calibration manager, the calibration manager having instructions that are executed by the processing device, the instructions including the following logic:
receiving a frequency ratio that is determined by comparing real time clock (RTC) clock signals and temperature compensated crystal oscillator (TCXO) clock signals, and estimating a current RTC frequency based on the received frequency ratio, the TCXO clock signals being sent to a GPS receiver, the computing device being configured to calibrate an estimated RTC time being maintained at an RTC circuitry based on an estimated RTC frequency from a prior estimation, the current RTC frequency and an elapsed time of the RTC circuitry;
a real time clock (RTC) circuitry that generates the RTC clock signals;
a temperature compensated crystal oscillator (TCXO) that generates the TCXO clock signals;
a ratio counter circuitry that receives both the RTC clock signals and the TCXO clock signals and determines the frequency ratio by comparing the RTC clock signals and the TCXO clock signals,
wherein the RTC circuitry includes a RTC oscillator, a RTC counter, and a RTC alarm, the RTC oscillator being designed to generate the RTC clock signals, the RTC counter being designed to receive the RTC clock signals and generates an RTC counter value, the RTC alarm being designed to receive the RTC counter value and generates RTC alarm values based on a predetermined RTC counter value,
wherein the ratio counter circuitry includes an acquisition clock (ACQCLK) counter that is electrically coupled to the TCXO and generates an ACQCLK counter value based on the TCXO clock signals, the ratio counter circuitry further including an edge aligned ratio counter (EARC) that receives the TCXO clock signals from the TCXO, the RTC clock signals from the RTC oscillator, and latches the RTC counter and the ACQCLK counter at a point in time where edges of the RTC clock signals and the TCXO clock signals are aligned, and responsive to the edges of the RTC counter value and the ACQCLK counter value are aligned, transferring time to or from the RTC counter, the EARC allowing the computing device to determine the difference in the number of counts from both the RTC counter and the ACQCLK counter as a ratio of count differences of nearly integer clock periods over a measurement period.

10. The computing device as defined in claim 9, wherein the RTC circuitry includes the RTC oscillator, the RTC counter, and the RTC alarm, the RTC oscillator being designed to generate the RTC clock signals, the RTC counter being designed to receive the RTC clock signals and generates an RTC counter value, the RTC alarm being designed to receive the RTC counter value and generates RTC alarm values based on a predetermined RTC counter value.

11. The computing device as defined in claim 10, wherein the ratio counter circuitry includes the RTC counter, the RTC alarm, a latch, and an acquisition clock (ACQCLK) counter, the ACQCLK counter being electrically coupled to the TCXO and generates an ACQCLK counter value based on the TCXO clock signals, the latch being configured to receive the RTC alarm values from the RTC alarm and the ACQCLK counter value from the ACQCLK counter, and determines the frequency ratio of the RTC oscillator and the TCXO, the ratio being defined as the ratio of the difference of the RTC alarm values and acquisition count values at two successive alarm times constituting a ratio measurement period.

12. The computing device as defined in claim 11, wherein the RTC circuitry includes the RTC oscillator that is used to sense a temperature of the TCXO by way of using the frequency ratio of the RTC oscillator and the TCXO as an effective temperature of the TCXO.

13. The computing device as defined in claim 12, further comprising a GPS receiver and GPS DSP that both facilitate in calculating a navigation drift that is used to calibrate a current estimate of an ACQCLK frequency of the ACQCLK counter, the navigation drift being defined as an estimate of the frequency error of the TCXO at the time and location a navigation solution was computed.

14. The computing device as defined in claim 13, further comprising a frequency versus temperature table that stores the navigation drift at the effective temperature of the TCXO.

15. A computing device comprising:
a processing device; and
memory that includes a calibration manager, the calibration manager having instructions that are executed by the processing device, the instructions including the following logic:
receiving a frequency ratio that is determined by comparing real time clock (RTC) clock signals and temperature compensated crystal oscillator (TCXO) clock signals, and estimating a current RTC frequency based on the received frequency ratio, the TCXO clock signals being sent to a GPS receiver, the computing device being configured to calibrate an estimated RTC time being maintained at an RTC circuitry based on an estimated RTC frequency from a prior estimation, the current RTC frequency and an elapsed time of the RTC circuitry;
a real time clock (RTC) circuitry that generates the RTC clock signals;
a temperature compensated crystal oscillator (TCXO) that generates the TCXO clock signals;
a ratio counter circuitry that receives both the RTC clock signals and the TCXO clock signals and determines the frequency ratio by comparing the RTC clock signals and the TCXO clock signals,
wherein the RTC circuitry includes a RTC oscillator that is used to sense a temperature of the TCXO by way of using the frequency ratio of the RTC oscillator and the TCXO as an effective temperature of the TCXO;
a GPS receiver and GPS DSP that both facilitate in calculating a navigation drift that is used to calibrate a current estimate of an ACQCLK frequency of the ACQCLK counter, the navigation drift being defined as an estimate of the frequency error of the TCXO at the time and location a navigation solution was computed; and
a frequency versus temperature table that stores the navigation drift at the effective temperature of the TCXO,
wherein during a RTC time maintenance mode, the computing device retrieves the navigation drift at the effective temperature from the frequency temperature table, the computing device being configured to add the navigation drift to a nominal ACQCLK frequency, the sum of which being multiplied by the frequency ratio to yield an estimate of the current RTC frequency, the current RTC frequency being used to calibrate the estimated RTC time being maintained at the RTC circuitry.

16. The computing device as defined in claim 15, further comprising a temperature sensor that senses the temperature of the TCXO and sends the temperature information associated with the sensed temperature to the computing device, which determines whether the sensed temperature is above or below a room temperature since the RTC oscillator has a parabolic RTC temperature curve that is quasi-symmetric around the room temperature, the computing device being configured to select the navigation drift at the effective temperature in the frequency temperature table either above or below the room temperature based on the sensed temperature.

17. The computing device as defined in claim 15, wherein the computing device tracks the trend of the frequency ratio after a high powered volatile circuitry is turned on to detect that the temperature of the TCXO is either above or below a room temperature since the RTC oscillator has a parabolic RTC temperature curve that is quasi-symmetric around the room temperature, responsive to determining whether the temperature is above or below the room temperature, the computing device being configured to select the navigation drift at the effective temperature in the frequency temperature table either above or below the room temperature based on the tracking of the trend of the frequency ratio.

* * * * *